United States Patent
Chiang et al.

(10) Patent No.: US 6,886,892 B2
(45) Date of Patent: May 3, 2005

(54) COMBINATION OF BICYCLE SPOKES AND RIMS

(75) Inventors: Douglas Chiang, Dali (TW); Eric Alan Hjertberg, Dali (TW)

(73) Assignee: Tien Hsin Industries Co., LTD, Tali (TW)

( * ) Notice: Subject to any disclaimer, the term of this patent is extended or adjusted under 35 U.S.C. 154(b) by 0 days.

(21) Appl. No.: 10/632,639

(22) Filed: Aug. 1, 2003

(65) Prior Publication Data

US 2005/0023884 A1    Feb. 3, 2005

(51) Int. Cl.[7] .............. B60B 1/02; B60B 5/00; B60B 9/26

(52) U.S. Cl. .............. 301/58; 301/55; 301/104

(58) Field of Search ............. 301/55, 58–59, 301/61, 104, 105.1, 110.5, 110.6, 95.101, 301/79; 29/894.33, 894.331, 894.332, 894.333

(56) References Cited

U.S. PATENT DOCUMENTS

| | | | | |
|---|---|---|---|---|
| 309,566 | A | * | 12/1884 | Schad et al. .................. 301/58 |
| 433,193 | A | * | 7/1890 | Best ............................. 301/59 |
| 1,042,689 | A | * | 10/1912 | Koen ............................ 301/58 |
| 1,226,421 | A | * | 5/1917 | Van Horn ..................... 301/79 |
| 4,040,671 | A | * | 8/1977 | Hersh .......................... 301/58 |
| 4,626,036 | A | * | 12/1986 | Hinsberg et al. .............. 301/58 |
| 4,729,605 | A | * | 3/1988 | Imao et al. ................. 301/104 |
| 5,064,250 | A | * | 11/1991 | Yashiro et al. ......... 301/64.101 |
| 5,110,190 | A | * | 5/1992 | Johnson ........................ 301/55 |
| 5,499,864 | A | * | 3/1996 | Klein et al. ............ 301/95.104 |
| 6,036,279 | A | * | 3/2000 | Campagnolo ................ 301/55 |
| 6,409,278 | B1 | * | 6/2002 | Nakajima ..................... 301/59 |

* cited by examiner

Primary Examiner—Russell D. Stormer
Assistant Examiner—Jason R. Bellinger

(57) ABSTRACT

A bicycle rim includes a plurality of holes defined therethrough and each hole has a recess defined in an inner periphery of the rim. A diameter of the recess is larger than a diameter of the hole so that an end of a spoke is engaged with the recess. A screw extends through the hole in the rim and threadedly engaged with a threaded hole defined longitudinally in the end of the spoke.

2 Claims, 5 Drawing Sheets

COMBINATION OF BICYCLE SPOKES AND RIMS

FIELD OF THE INVENTION

The present invention relates to a bicycle rim having a plurality of holes defined therethrough and each hole includes a recess defined in an inner periphery of the rim so as to receive an end of the spoke which is fixed to the rim by a screw from an outer periphery of the rim.

BACKGROUND OF THE INVENTION

A conventional bicycle wheel is disclosed in FIG. 5 and generally includes a rim 50 to which a tire (not shown) is connected, and a plurality of spokes 60 are connected between the rim 50 and a hub (not shown) at the center of the wheel. The connection of the spoke 60 and the rim 50 is made by inserting a connection piece 70 in the rim 50 so that an end of the spoke 60 is threadedly connected to the connection piece 70. The spoke 60 is made of steel and has a diameter of 2 mm and the rim 50 has to be drilled a hole 51 of 4 mm for receiving the connection piece 70. In order to reduce the weight of the wheel, the latest spoke 60' is made of aluminum alloy and has a diameter of 4 mm as shown in FIG. 6. In order to install the connection pieces 70, the holes 52 in the rim 50 have to be enlarged to 6 mm in diameter. The larger diameter of the holes are drilled, the less strength of the rim 50 will be. The rim bears the load of the bicycle frame and the weight of the cyclist, so that the size of the holes in the rim has to be reduced while the diameter of the spokes is kept being large enough.

The present invention intends to provide a rim that includes holes with larger recess in an inner periphery of the rim so as to received an end of the spoke which is fixed to the rim by a screw from outer periphery of the rim.

SUMMARY OF THE INVENTION

In accordance with one aspect of the present invention, there is provided a bicycle rim which has a plurality of holes defined therethrough and each hole includes a recess in an inner periphery of the rim. The size of the recess is larger than the hole. Each spoke includes a threaded hole in an end thereof and a screw extends through the hole in the rim and is connected to the threaded hole in the spoke.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
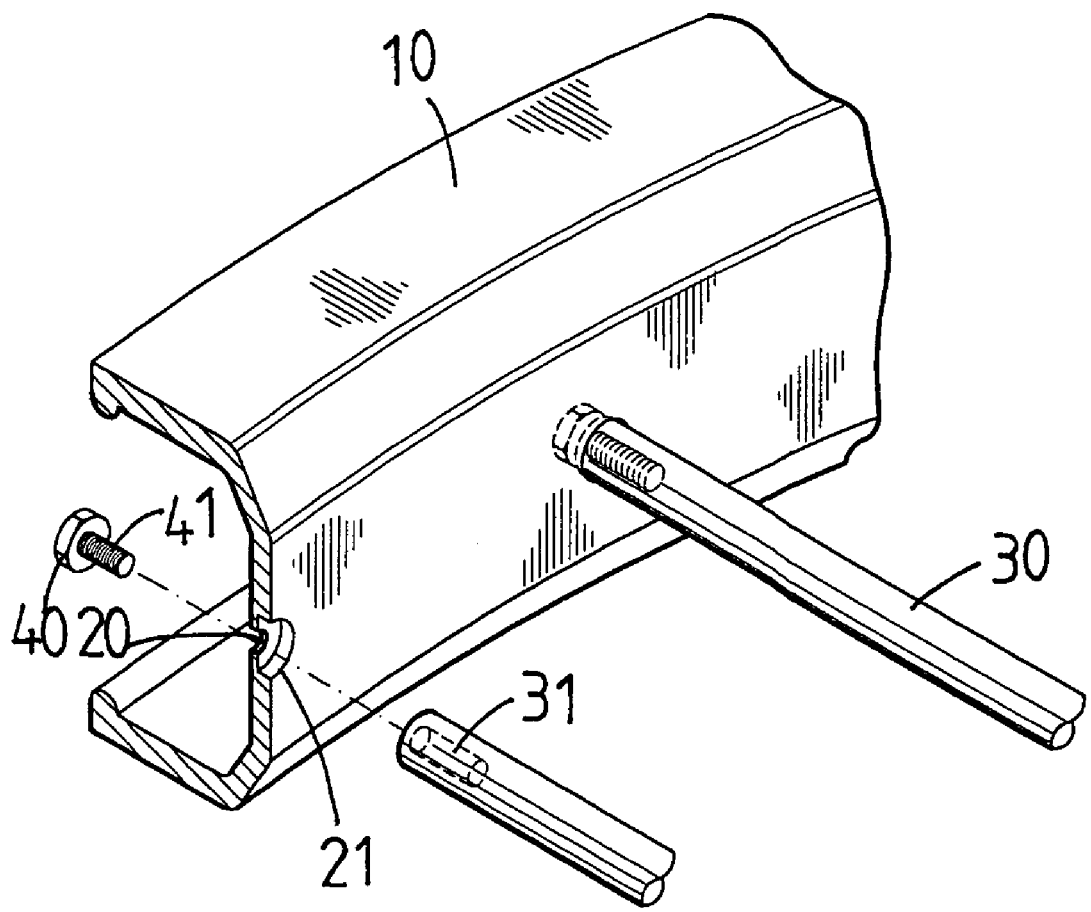
FIG. 1 is an exploded view to show the rim and spokes of the present invention.
Figure 2:
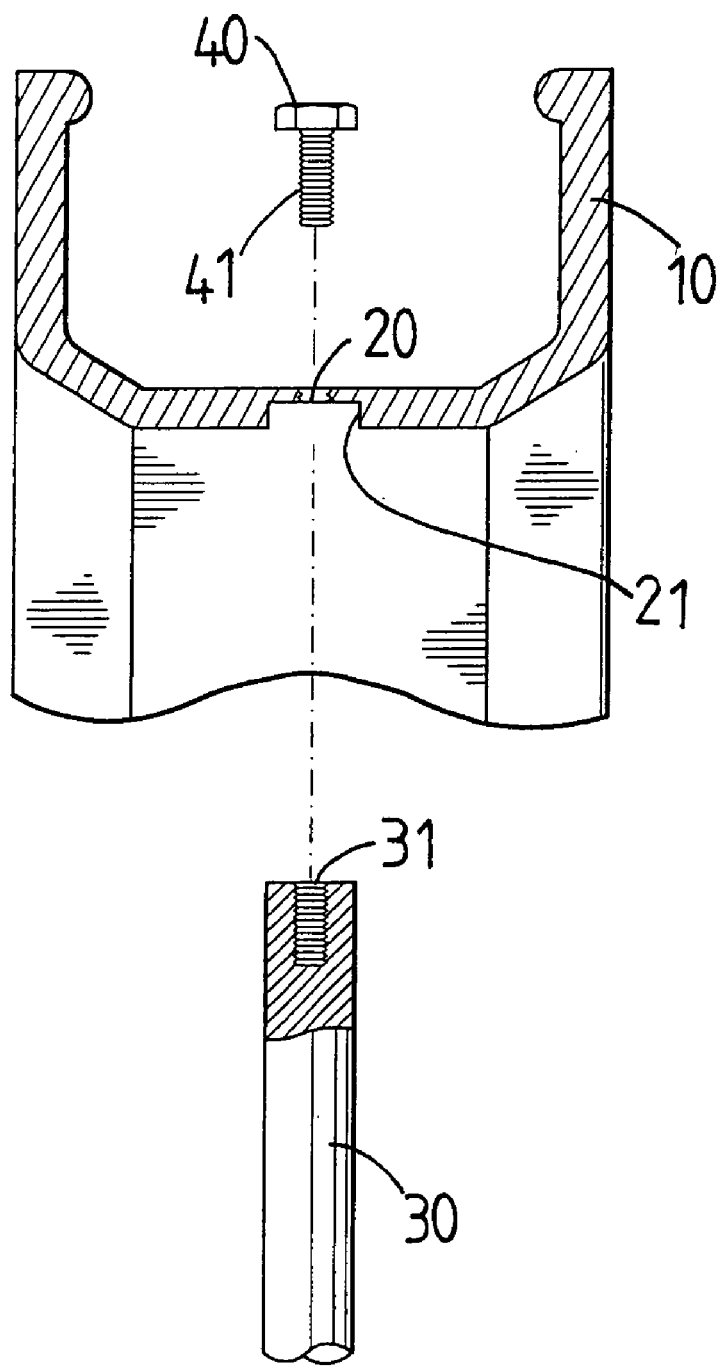
FIG. 2 is a cross sectional view to show the holes in the rim and the threaded hole in the spokes.

Referring to FIGS. 1 and 2, the rim 10 of the present invention comprises a plurality of holes 20 defined therethrough and a plurality of recesses 21 are defined in an inner periphery of the rim 10. The recesses 21 and the holes 20 are located to share a common axis. A diameter of the recess 21 is larger than a diameter of the hole 20.

A plurality of spokes 30 are connected between a hub (not shown) and the inner periphery of the rim 10. Each spoke 30 has a threaded hole 31 defined longitudinally in a first end thereof and the first end of the spoke 30 is engaged with the recess 21. A second end (not shown) of each of the spokes 30 is connected to the hub. A screw 40 has its threaded shank extending through the hole 20 and threadedly engaged with the threaded hole 31 in the end of the spoke 30. Each screw 40 includes a head connected to the shank, and a diameter of the head is larger than a diameter of the hole 20 in the rim 10.

By this arrangement, the size of the holes 20 in the rim 10 is maintained to be small and the structural strength of the rim is therefore not reduced.

Figure 3:
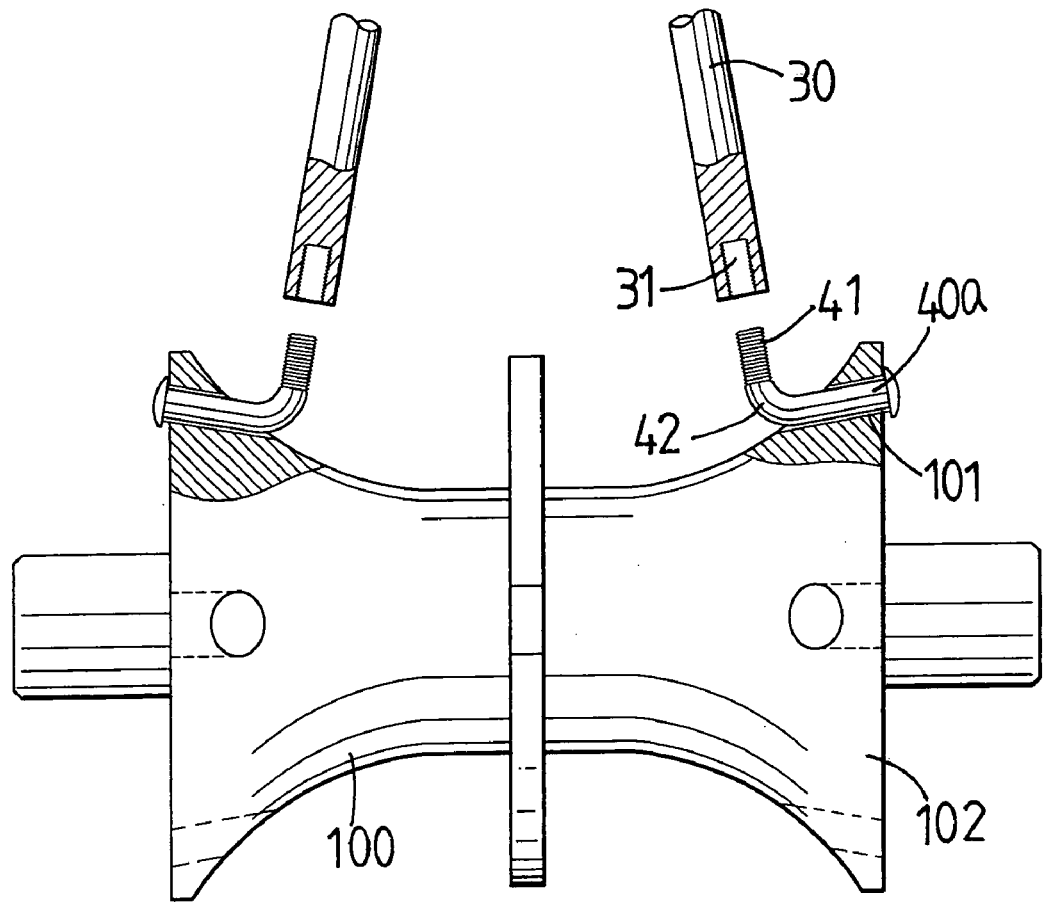
FIG. 3 is an exploded view to show the hub and spokes of the present invention.
Figure 4:
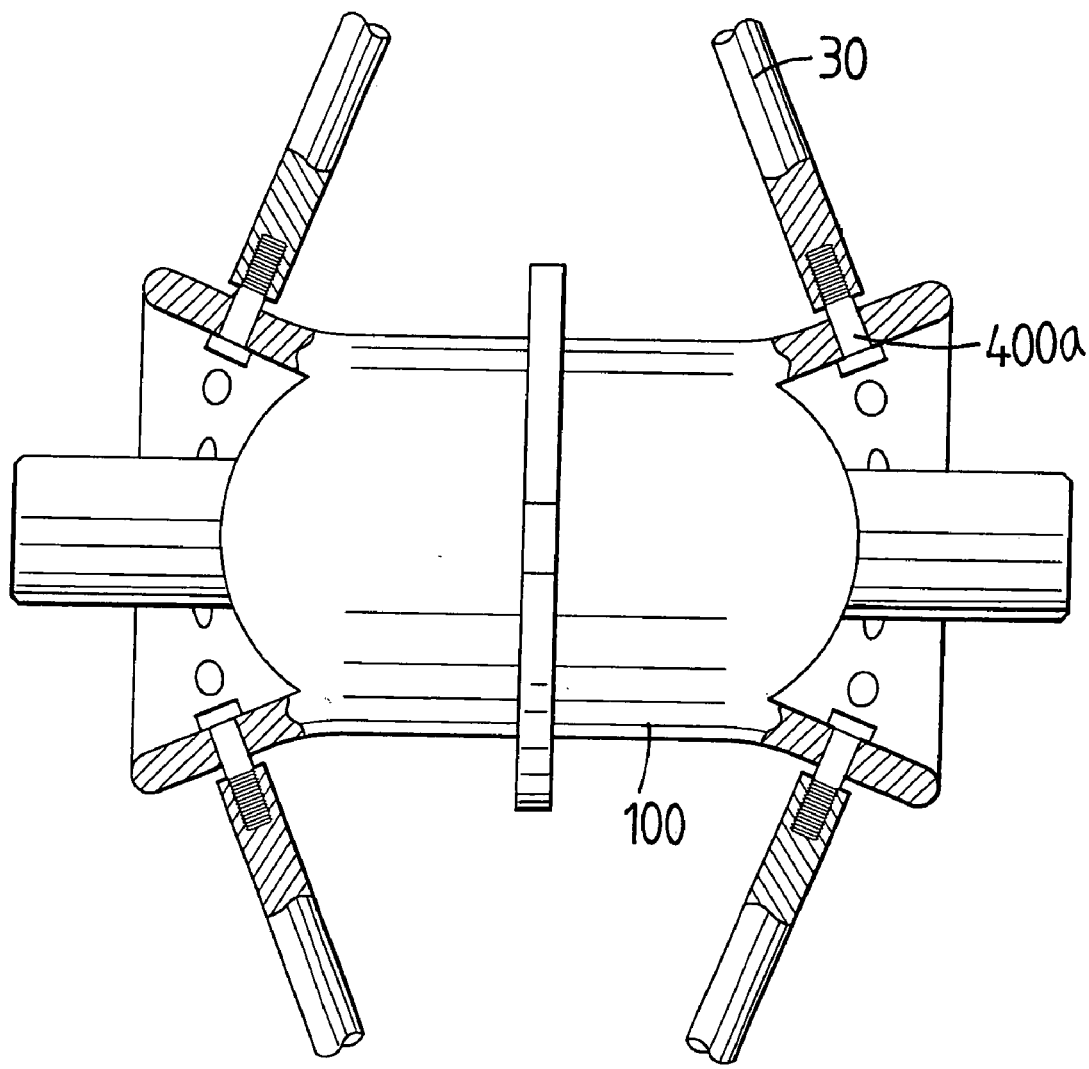
FIG. 4 is a cross sectional view to show another embodiment of the hub and spokes of the present invention.
Figure 5:
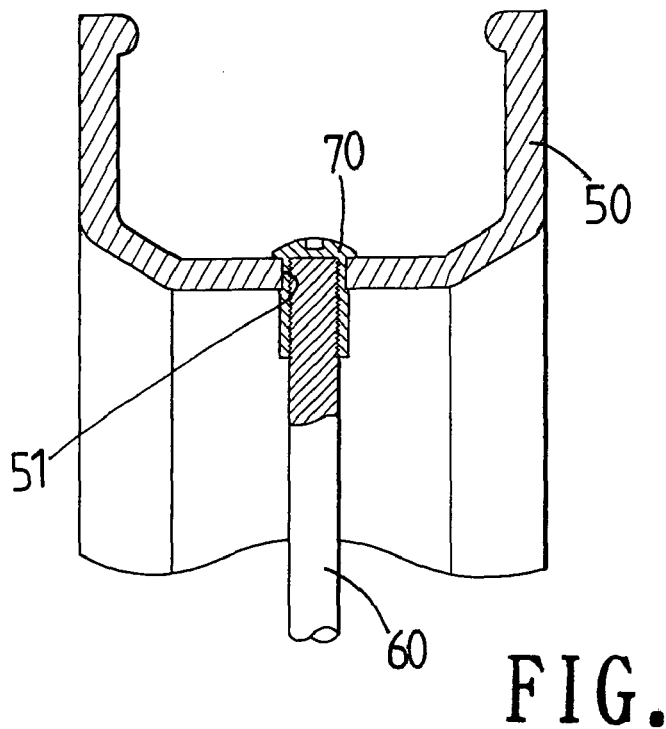
FIG. 5 is a cross sectional view to show the connection of the conventional steel spoke and rim.
Figure 6:
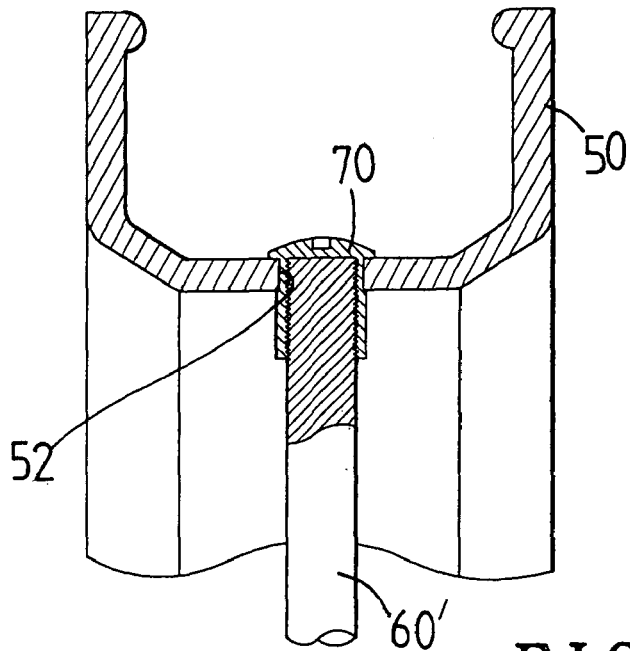
FIG. 6 is a cross sectional view to show the connection of the conventional aluminum alloy spoke and rim.

Referring to FIGS. 3 and 4, the similar way of connection can be used for the connection of hub 100 and spokes 30. The hub 100 comprises a plurality of holes 101 defined through flanges 102 thereof and each hole 101 has a connection member 40a extending therethrough. Each connection member 40 has a curve shank 42 and a head which is located at an outside of the flanges, and a distal end of the curve shank 42 has a threaded portion 41a located beyond the hole 101 and at inside of the flanges. The threaded portion 41 is threadedly connected to a threaded hole 31 defined longitudinally in an end of the spoke 30.

As shown in FIG. 4, the connection members 400a can also be an ordinary screw which has a straight shank and extends through the flanges of the hub 100 so as to be connected to the spokes 30.

While we have shown and described the embodiment in accordance with the present invention, it should be clear to those skilled in the art that further embodiments may be made without departing from the scope of the present invention.

What is claimed is:

1. A combination of spoke and rim, wherein the rim comprises a plurality of holes defined therethrough and each hole has a recess defined in an inner periphery of the rim, a diameter of the recess is larger than a diameter of the hole, the spoke has a threaded hole defined longitudinally in an end thereof and the end of the spoke is engaged with the recess, a screw extends through the hole and is threadedly engaged with the threaded hole in the end of the spoke.

2. The combination as claimed in claim 1, wherein the screw includes a head and a shank which has threads, a diameter of the head is larger than a diameter of the hole in the rim.

* * * * *